July 12, 1949.  R. CARBERT  2,475,590
WAGON BOX
Filed Sept. 26, 1946  2 Sheets-Sheet 1
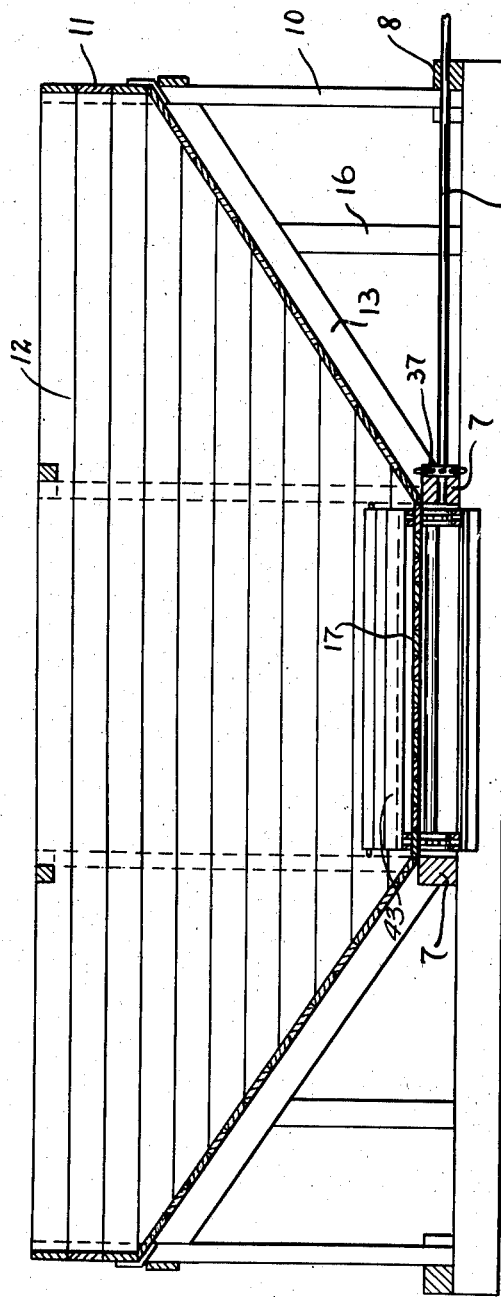
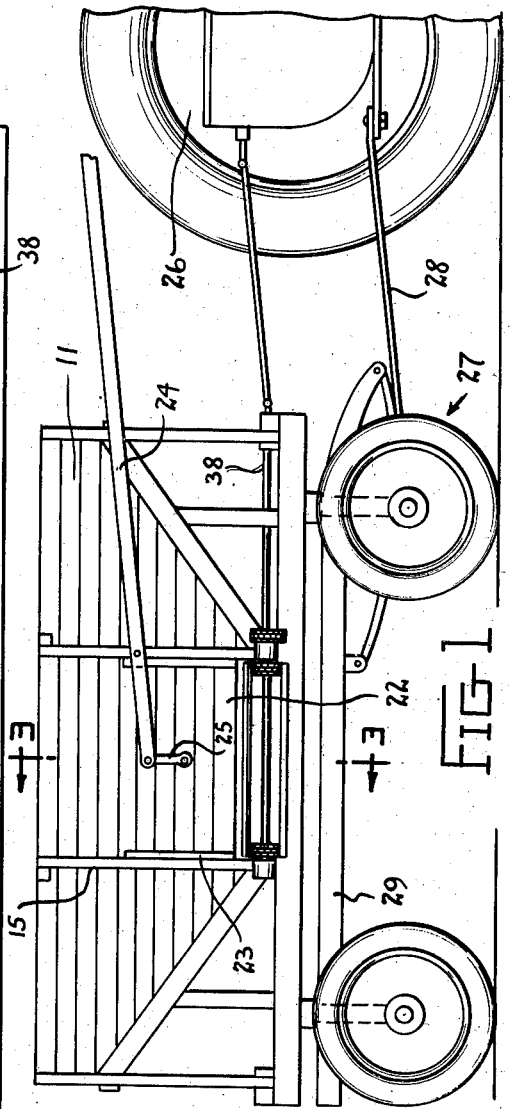
Inventor
RALPH CARBERT
By *Clarence A. O'Brien and Harvey B. Jacobson*
Attorneys July 12, 1949.   R. CARBERT   2,475,590
WAGON BOX Filed Sept. 26, 1946   2 Sheets-Sheet 2

Inventor
RALPH CARBERT

By Clarence A. O'Brien
and Harvey B. Jacobson
Attorneys

Patented July 12, 1949

2,475,590

UNITED STATES PATENT OFFICE 2,475,590

WAGON BOX

Ralph Carbert, Morris, Minn.

Application September 26, 1946, Serial No. 699,469

2 Claims. (Cl. 214—83.36)

The present invention relates to new and useful improvements in wagon boxes and more particularly to a device of this character adapted for removably mounting on the frame or chassis of a trailer for use in hauling a load and which may be removed from the trailer in order that the trailer may be used for other purposes.

An important object of the present invention is to provide an endless unloading conveyor for unloading the material in the wagon box at one side thereof together with means for operatively connecting the conveyor to the power take-off of a tractor or other towing vehicles.

A further object of the invention is to provide a device of this character of simple and practical construction, which is strong and durable, efficient and reliable in use and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view showing the wagon box mounted in position on a trailer;

Figure 2 is an enlarged longitudinal sectional view thereof;

Figure 3:
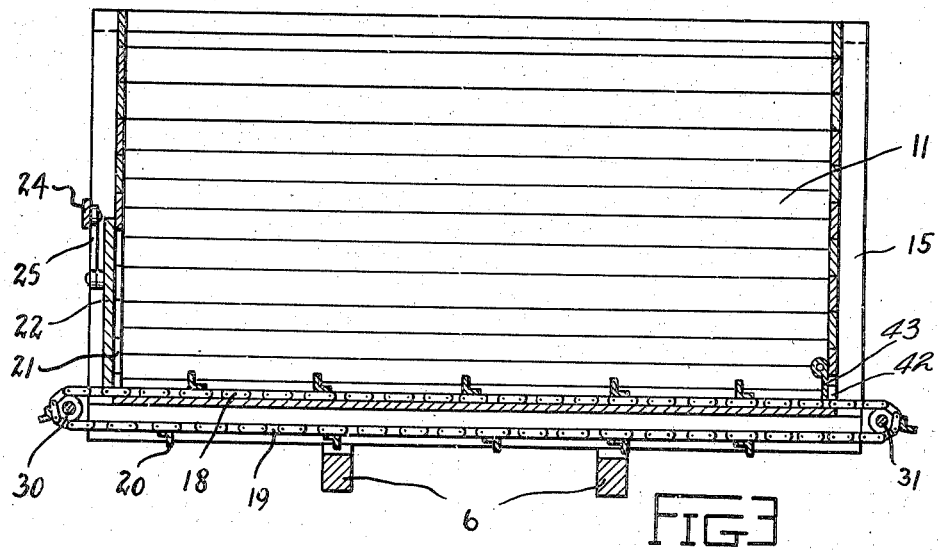
Figure 3 is a transverse sectional view taken on the line 3—3 of Figure 1.

Referring now to the drawings in detail wherein for the purpose of illustration I have disclosed a preferred embodiment of the invention, the numeral 5 designates the frame generally of the wagon box and which includes a pair of longitudinal beams 6 on which a pair of cross-beams 7 rest and which are suitably secured thereto, the cross-beams being positioned in spaced parallel relation with respect to each other adjacent the center of the longitudinal beams 6.

The front and rear ends of the longitudinal beams 6 are connected to each other by transverse frame members 8 and 9 and to which the lower ends of posts 10 are attached for supporting the front and rear ends of the box 11.

Figure 4:
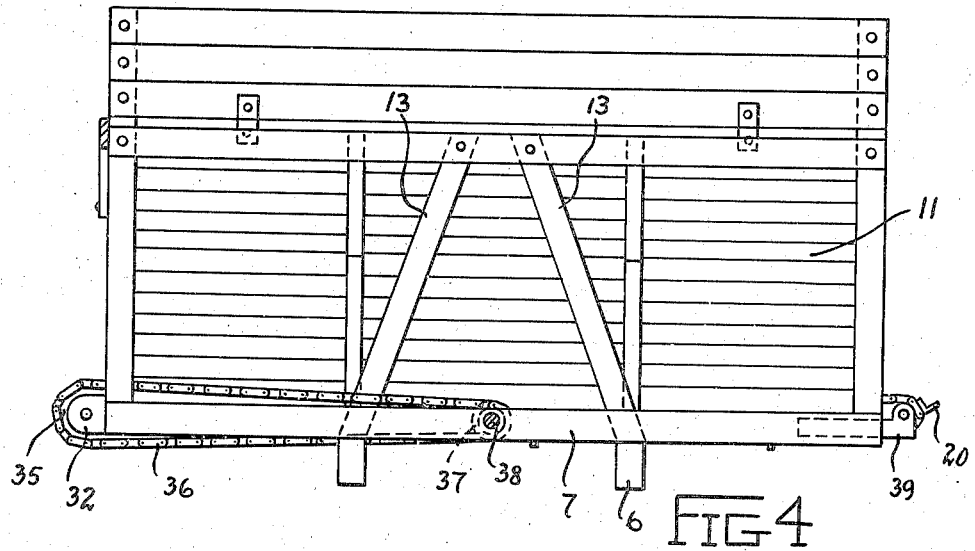
Figure 4 is a front elevational view.
Figure 5:
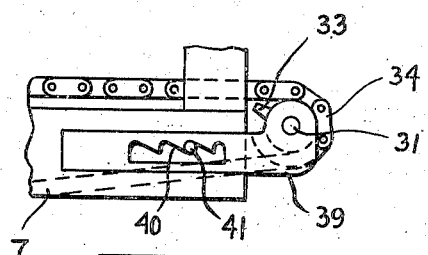
Figure 5 is an enlarged fragmentary side elevational view showing the chain tightener for the drive chain of the endless conveyor.

The box 11 is composed of slats 12 with the bottom of the box at the front and rear ends sloping inwardly from the posts 10 to the transverse beams 7, the sloping bottom of the box being supported on inclined beams 13 which converge toward their upper ends as shown in Figure 4 of the drawings.

The slats of the sides of the box are secured to uprights 15 at the front and rear ends of the box and at points intermediate the ends thereof. Intermediate uprights 16 are also provided for bracing the sloping ends of the box.

The bottom of the box 11 between the cross-beams 7 is flat as indicated at 17 and travelling transversely of the box above and below the flat bottom portion 17 are the upper and lower flights 18 and 19 of an endless conveyor to which are secured cleats 20.

One side of the box 11 is formed with an opening 21 controlled by a door 22 slidable vertically with its side edges in guides 23 secured to the center uprights 15 at the sides of the box.

A lever 24 is pivoted adjacent its rear end to one of the uprights 15 and is connected to the door 22 by a link 25, the lever projecting forwardly of the wagon box for manipulation by the driver of a tractor 26 or other power operated vehicle used for towing a trailer 27 by means of a draw bar 28. The trailer 27 includes a chassis or frame 29 on which the frame 5 of the wagon box rests to removably support the box on the trailer.

The endless conveyor is arranged to travel on shafts 30 and 31 journaled in brackets 32 projecting outwardly at the sides of the box, the shafts having sprockets 33 secured thereto for driving a chain 34 at the edges of the conveyor. Also secured to the shaft 30 is a second sprocket 35 driven by a chain 36 from a sprocket 37 secured to the rear end of a drive shaft 38 which is journaled in the front transverse frame member 8 and the adjacent cross-beams 7, the shaft 38 projecting forwardly of the box for attaching to the power take-off of the tractor (not shown) or other suitable power drive means.

The shaft 31 for the endless conveyor is journaled in adjustable bearing brackets 39 slidably mounted on the cross-beams 6, the brackets including notches 40 for selective engagement with a pin 41 secured to the cross-beams. The brackets 39 accordingly function as chain tighteners for the chain 34.

The side of the box 11 opposite from the opening 21 is also provided with a smaller opening 42 to accommodate the upper flight of the conveyor, and a resilient shield 43 is secured in the box to cover the opening 42 except when the cleats 20 are passing therethrough.

By removably supporting the box on the trailer 29 the box may be removed, when desired, and the trailer used for other purposes.

The box 11 may hold grain or other material for transporting the same from a field to a bin or other storage and unloaded by opening the door 22 and operating the conveyor from the tractor.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What I claim as my invention is:

1. A wagon box comprising a frame including longitudinal and transverse beams adapted to rest on a trailer chassis, said box including side and end walls and a bottom, an endless conveyor having upper and lower flights arranged to travel transversely above and below the bottom, said conveyor including shafts at each end of the conveyor journaled exteriorly upon each side of the box, a chain and sprocket drive connection for the shafts, a slidably adjusted bearing for one of the shafts to tighten the chain, one of said side walls having a discharge opening through which the conveyor travels, the other of said side walls having an aperture for the upper flight of the conveyor, a resilient shield mounted on said other side wall to cover the aperture when necessarily opened by passing portions of said conveyor, a vertically sliding door for the discharge opening, and power operating means for one of the shafts of the conveyor.

2. A wagon box comprising a frame including longitudinal and transverse beams adapted to rest on a trailer chassis, said box including side and end walls and a bottom, an endless conveyor having upper and lower flights arranged to travel transversely above and below the bottom, said conveyor including shafts at each end of the conveyor journaled exteriorly upon each side of the box, a chain and sprocket drive connection for the shafts, a slidably adjusted bearing for one of the shafts to tighten the chain, one of said side walls having a discharge opening through which the conveyor travels, the other of said side walls having an aperture for the upper flight of the conveyor, a resilient shield mounted on said other side wall to cover the aperture when necessarily opened by passing portions of said conveyor, a vertically sliding door for the discharge opening and power operating means for one of the shafts of the conveyor, said bearing comprising a pair of brackets having notches selectively engageable with pins fixed on said frame.

RALPH CARBERT.

REFERENCES CITED

The following references are of record in the file of this patent:

UNITED STATES PATENTS

| Number | Name | Date |
| --- | --- | --- |
| 1,497,622 | Weber | June 10, 1924 |
| 1,515,328 | Barkmann et al. | Nov. 11, 1924 |
| 2,139,162 | Jenkins | Dec. 6, 1938 |
| 2,293,486 | Barrett | Aug. 18, 1942 |
| 2,321,168 | Tognetti | June 8, 1943 |